E. K. DAY.
SCREW.
APPLICATION FILED JULY 16, 1917.

1,260,154.

Patented Mar. 19, 1918.

INVENTOR
Edgar K. Day
BY
H. E. Dunlap
ATTORNEY

UNITED STATES PATENT OFFICE.

EDGAR K. DAY, OF WHEELING, WEST VIRGINIA, ASSIGNOR TO WHITAKER-GLESSNER COMPANY, OF WHEELING, WEST VIRGINIA, A CORPORATION OF WEST VIRGINIA.

SCREW.

1,260,154.    Specification of Letters Patent.    Patented Mar. 19, 1918.

Application filed July 16, 1917. Serial No. 180,731.

*To all whom it may concern:*

Be it known that I, EDGAR K. DAY, a citizen of the United States of America, and resident of Wheeling, county of Ohio, and State of West Virginia, have invented certain new and useful Improvements in Screws, of which the following is a specification.

This invention relates broadly to screws, and more particularly to a screw for attaching sheet metal plates and the like.

The primary object of the invention is to provide a screw for use in attaching metal plates, as ceiling plates, wall plates and the like to metal furring strips, and in securing together the overlapped edges of such plates.

A further object is to provide a screw for attaching metal plates which securely holds two or more overlapped thicknesses of metal in rigid relation and which cannot retract nor work loose.

A still further object of the invention is to provide a screw of the character mentioned having a form which adapts it for ready application to the work and which does not require that the plates be preliminarily punctured.

With these and other objects in view, the invention resides in the features of construction which will hereinafter be fully described, reference being had to the accompanying drawings, in which—

Referring to said drawings, in which like designating characters distinguish like parts throughout the several views—

Figure 2:
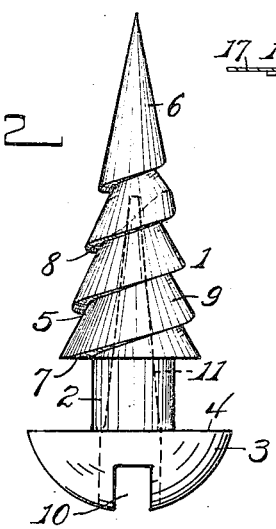
Fig. 2 is a similar view greatly enlarged.
Figure 4:
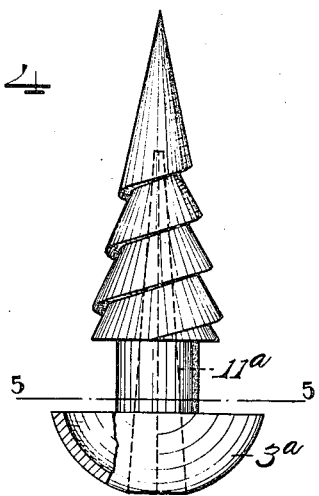
Fig. 4 is a side elevation of a slightly modified form.

1 indicates generally a screw body or shank of tapered form having a neck portion 2 of reduced diameter and having a head 3 with a flat under face 4. Formed in the body 1 is a spirally cut thread 5 which rises or begins at a suitable distance from the pointed end of said body, leaving a plain tapered or conical end 6 of suitable dimensions leading up to said threads whereby the metal plate or plates to be secured may be punctured. Said thread 5 extends back toward the head 3 and terminates at the butt-end or annular shoulder 7 formed at the junction of said body with said neck 2. Said thread is of peculiar form, the rear face 8 thereof extending in a substantially radial direction, as shown in Figs. 2 and 4, or it may be slightly undercut, as shown at 8ª in Fig. 6. The front or outer face 9 of the thread is gradually inclined rearward from the inner angle thereof in the general direction of the head 3.

Figure 3:
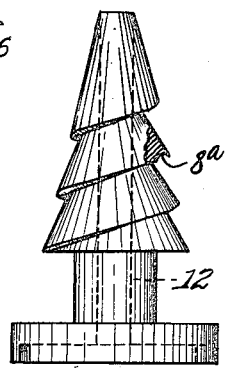
Fig. 3 is an end elevation of the same.
Figure 3:
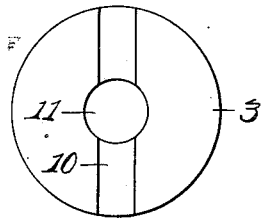

The head is preferably provided with the usual cross-kerf 10 for the reception of the screw-driver-like end of a driving tool (not shown) which may have a centrally disposed prong or tine for seating in a socket 11 which extends axially into the body through the head and the neck, as shown in Figs. 2 and 3. As is apparent, the screw received upon a tool of the character mentioned will be properly held while being preliminarily entered and screwed into place in an overhead position, as in a ceiling.

Figure 1:
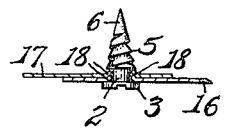
Figure 1 is a side elevation of my invention applied in attaching relation to two thicknesses of metal.
Figure 5:
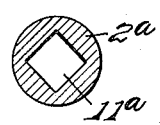
Fig. 5 is a cross section on line 5—5, Fig. 4; and—

The screw shown in Figs. 4 and 5 differ from that in Figs. 1, 2 and 3 in that a hollow oval head 3ª is employed and the socket 11ª is of rectangular form in cross section, adapting the screw for driving by means of a tool having a point or prong shaped to conform with or fit in said socket.

Figure 6:
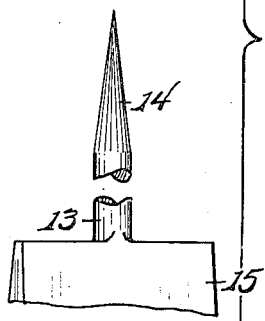
Fig. 6 is a side elevation of a second modified form, showing a portion of a tool designed for applying said form.

In the modification shown in Fig. 6, the screw has its inner end portion 6ª formed in truncated cone shape and has an axial bore extending through its entire length, said bore 12 being designed to have projected therethrough a cylindrical prong 13 having a tapered metal-puncturing point 14, such prong being carried by the screwdriver-like end of a tool by means of which the screw may be driven.

The screws are made with necks 2 of different lengths, and, in practice, selection is made of that length which most nearly corresponds with that required by the number of thicknesses of metal to be secured together or attached. Having punctured the metal sheets, as 16 and 17, Fig. 1, the screw is forced through the latter until the first or outer thickness or sheet 16 engages the thread 5, whereupon it is turned forward until all of the various sheets or thicknesses of metal are received by the neck portion. As is obvious, the burs or edges 18 surrounding the hole or puncture assume the inclined position shown in Fig. 1, in which position they are interlocked with the annular radially disposed shoulder 7, preventing retraction of the screw and separation of the sheets. The turning of the edges of the burs into outwardly and downwardly inclined position as the screw is being advanced is obviously facilitated by the provision of the arcuate undercut $8^a$ in the radial thread-defining wall, said undercut, when engaged by said edges, serving to guide the latter back toward the face of the innermost sheet.

What is claimed is—

1. A screw comprising a tapered body, a head, and a neck between said body and said head, said neck being of less diameter than the adjacent end of said body, and said body having a spiral thread formed therein, one of the thread-defining walls being disposed substantially radial with respect to said body and being undercut, and the other thread-defining wall being inclined toward said head, said body having an axial tool-receiving socket extending thereinto through said head and said neck.

2. A screw for attaching metal plates, comprising a tapered body, a head, and a neck between said body and said head; said body having formed therein a spiral thread of approximately uniform depth throughout whereon a bur of gradually increasing size is adapted to be formed in the plates about said screw as the latter is advanced; one of the thread-defining walls being disposed substantially radially with respect to said body, and the other thread-defining wall being inclined toward said head; said neck being of less diameter than the adjacent end of said body whereby is formed an annular rearwardly-facing shoulder with which the plates received by said neck interlock; said neck also having a length in excess of the thickness of the plates to permit of the reception of said bur behind said shoulder.

In testimony whereof, I affix my signature in presence of two subscribing witnesses.

EDGAR K. DAY.

Witnesses:
H. E. DUNLAP,
W. F. KEEFER.